July 4, 1933.   W. A. GIBBS   1,917,111
TRAP FOR CATCHING ANIMALS ALIVE
Filed Nov. 7, 1930   3 Sheets-Sheet 1
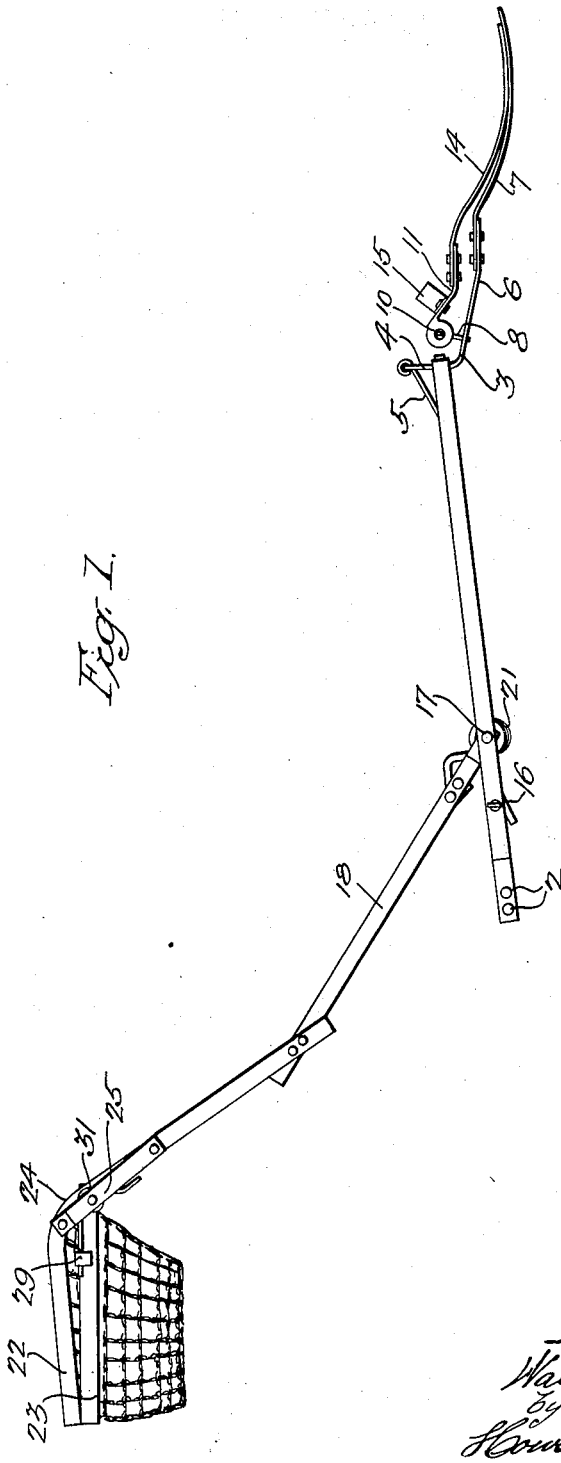

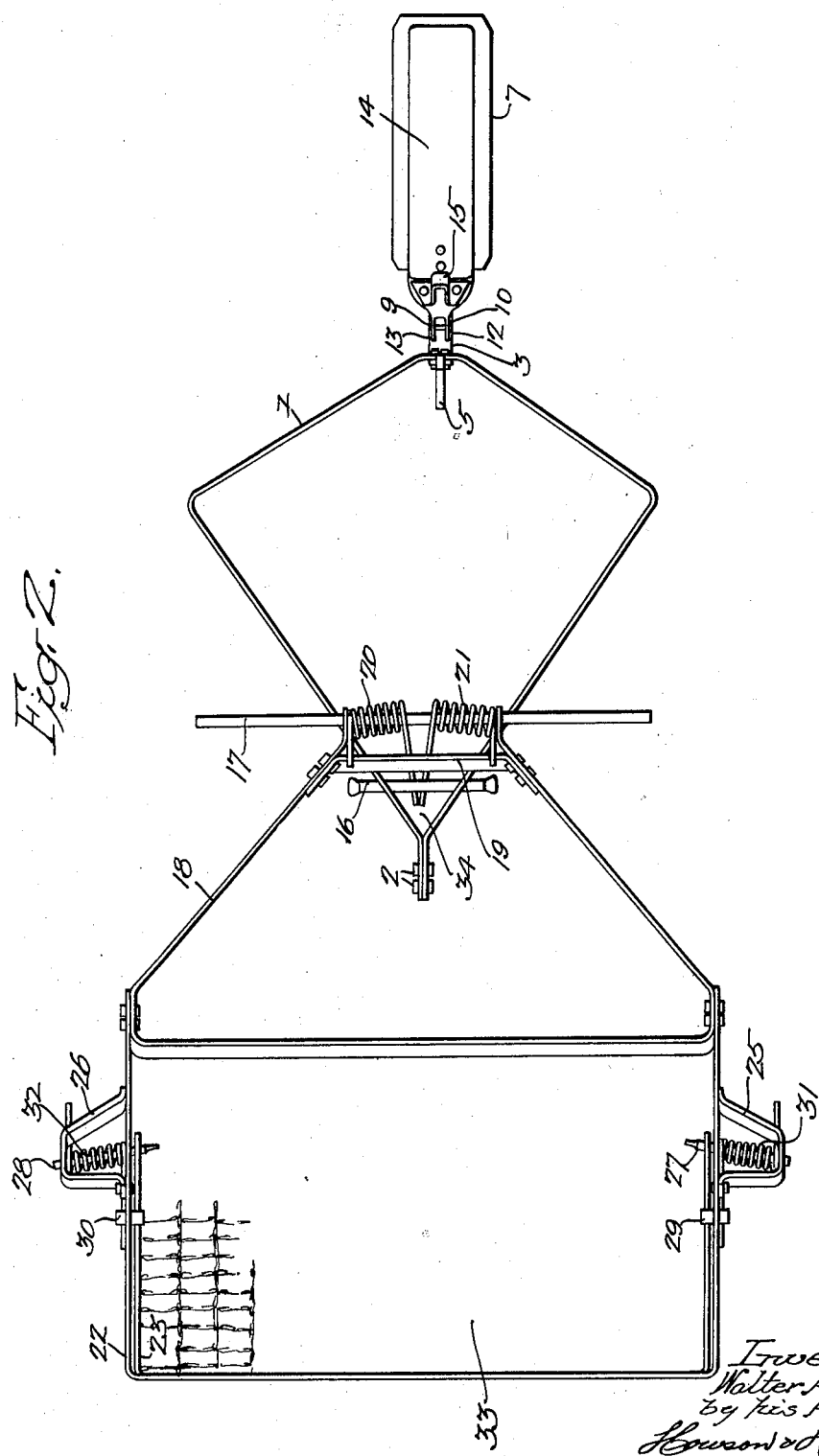

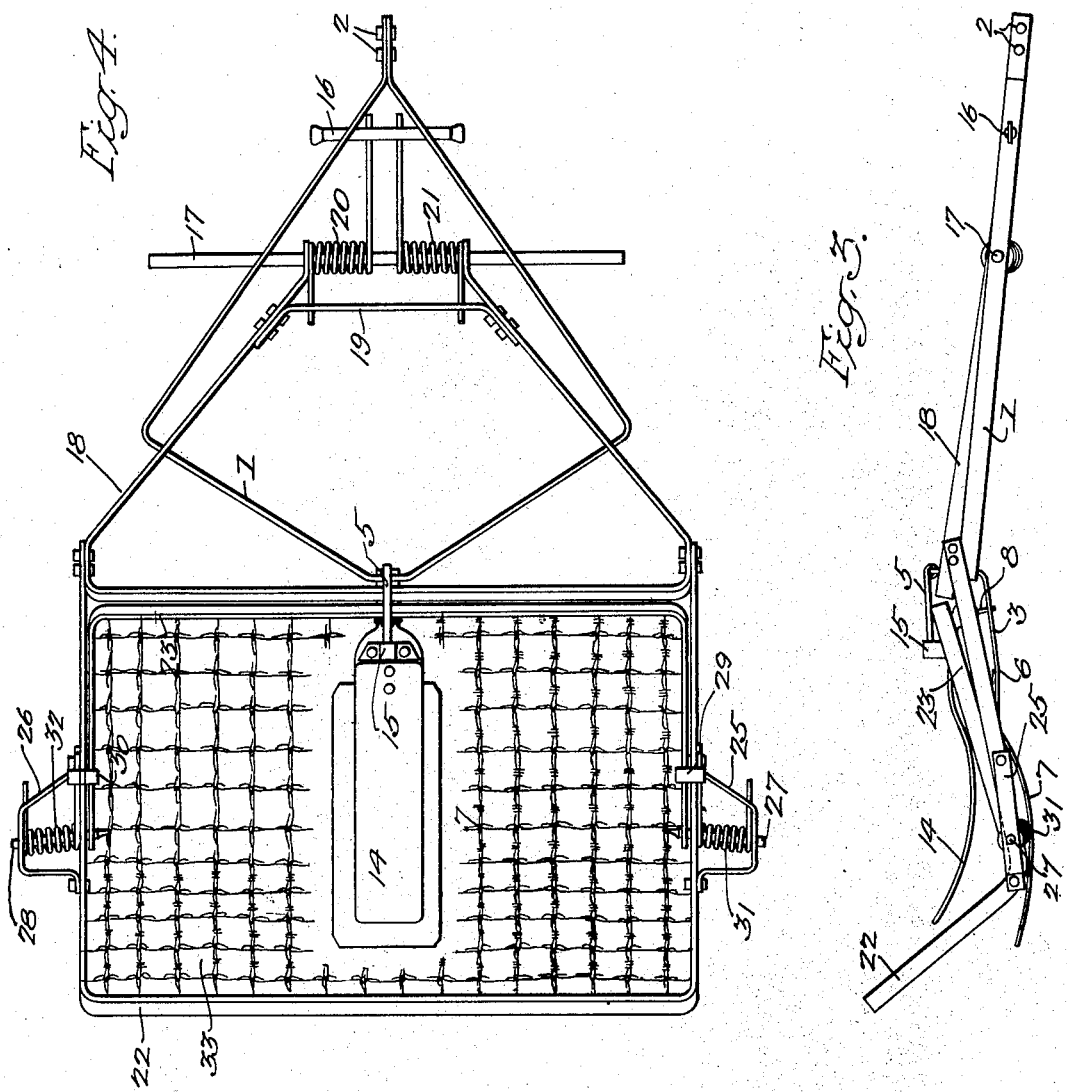

Patented July 4, 1933

UNITED STATES PATENT OFFICE

WALTER A. GIBBS, OF CHESTER, PENNSYLVANIA

TRAP FOR CATCHING ANIMALS ALIVE

Application filed November 7, 1930. Serial No. 494,135.

This invention relates to traps in general, and specifically to traps for catching animals alive, the general object of the invention being to provide a highly efficient device of this type which is simple in construction and has relatively few parts considering its nature and intended purpose.

In the trapping of animals, it is often desirable not to kill or maim the animal caught. Furthermore, in the case of water-inhabiting animals, it is desirable to lift the animal bodily, after it has been trapped, from the water in order to preserve its life by preventing drowning. A device constructed in accordance with my invention traps the animal in a manner to preserve it free from bodily harm or injury, and simultaneously with the trapping of the animal, the device lifts the animal and holds it suspended above the ground at a substantial distance from the position of the set trap.

In accordance with my invention, I provide a trap comprising a pair of relatively movable spring-operated jaws and a net attached thereto which will envelop the animal when the trap is sprung and the jaws close. The trap is carried by one of a pair of relatively movable spring-operated frames, the other of said frames serving as the base for the device. The device further comprises means for latching the trap in set position to render the spring means inoperative. A treadle is provided which is adapted to operate the latch means for releasing the elements of the device when an animal steps upon or disturbs the treadle.

The construction and operation of a specific embodiment of my invention will be clearly understood from the following detailed description when read in connection with the accompanying drawings.

In the drawings:

Fig. 1 is a view showing in elevation the device of my invention in released or sprung position;

Fig. 2 is a plan view of the device of Fig. 1;

Fig. 3 is an elevational view of the device of my invention in its set position; and Fig. 4 is a plan view of the device of Fig. 3.

Referring to the several views of the drawings, and particularly to Figs. 1 and 2, the device comprises a base 1 which may take the form of a rigid strip of metal bent in the manner shown in Fig. 2, and having its ends fastened together by any suitable means such as rivets 2. The base is formed in the manner illustrated to provide a large bearing area for the device upon the ground. An angle member 3 is fastened in any suitable manner to base 1 at a point opposite its fastened ends. One end 4 of this angle member is disposed in vertical position and is provided with an opening for the reception of a tongue 5. Tongue 5 may be formed of a short strip of metal having one end inserted through the opening in member 3 and bent to fasten it to the said member. It will be apparent that tongue 5 is adapted to rotate pivotally about the end of arm 4. The other arm 6 of angle member 3 is disposed substantially horizontally, and has attached to its end by rivets or the like a foot 7. An upright member 8, having a pair of protruding shoulders 9 and 10, is attached to arm 6 in any suitable manner. This member may be passed through an opening in arm 6, and may have its end flattened or welded to arm 6 to form a rigid attachment. A lever 11 has one end formed to provide pivotal portions 12 and 13 which are adapted to fit over shoulders 9 and 10, to thereby pivotally mount lever 11 upon member 8. This lever carries at its other end a treadle 14 which may be attached thereto in any suitable manner, such as by rivets. A catch 15 is attached to lever 11 by rivets or the like, and is adapted to receive tongue 5 to hold the device in its set position, as will appear more clearly hereinafter.

A rod 16 having enlarged ends passes through openings in base 1 as shown. A second and longer rod 17 also passes through the arms of base 1. A movable frame 18 has its ends pivotally attached to rod 17. This frame may be formed in the same manner as base 1 by bending a rigid strip of metal in the manner shown in Fig. 2. The ends of the frame may be provided with openings for the reception of rod 17. A strip of metal 19 has its ends riveted to the arms of frame 18, serving to rigidify the frame and also coacting with springs 20 and 21, as will appear later. These springs may each take the form of a coil spring, one end thereof passing over strip 19, while the other end extends beneath rod 16.

The trap of the device comprises a fixed or stationary jaw 22 and a movable jaw 23. These jaws may each be formed of a single strip of rigid metal bent in the manner clearly shown in Fig. 2. The fixed jaw has its ends bent as at 24 (see Fig. 1), and the ends are rigidly attached to frame 18 by means of rivets or the like. A pair of yokes 25 and 26 are attached to the arms of the stationary jaw in any suitable manner, such as by means of rivets.

A pair of rods 27 and 28 pass through openings in the yokes and in the ends of jaws of the trap, the ends of these rods being flattened to hold them in position. It will be clearly apparent that, by means of this construction, the movable jaw of the trap is pivotally attached to the stationary jaw. A pair of hook members 29 and 30 are attached in any suitable manner to the arms of the movable jaw. A pair of coiled springs 31 and 32 are wound upon rods 27 and 28, respectively. One end of each of these springs extends beneath the corresponding yoke, while the other end extends beneath the corresponding hook member on the movable jaw of the trap.

From the above description and the showing of the drawings, it will be apparent that springs 31 and 32 function to urge the movable jaw of the trap toward the stationary jaw to thereby close the same. A net envelop 33 is attached to the jaws of the trap, and may comprise a plurality of parallel chains having spaced cross links to provide the desired net. The net may, however, be made of any suitable material and in any suitable manner. The outer links of the net may be attached to the jaws of the trap by means of spaced openings around the jaws. It will also be apparent that springs 20 and 21 function to move the frame 18 relative to base 1. Due to the special construction of base 1, a small closure or space 34 is provided, and a stake or other suitable instrument may be inserted through this closure and driven into the ground to prevent the tipping over of the device during its operation. It is also important to note that the long rod 17 also functions to prevent the tipping over of the device.

Assuming that it is desired to set the device of Figs. 1 and 2, the base of the device may be held stationary, while frame 18 is drawn against the action of springs 20 and 21 to the position indicated in Figs. 3 and 4. At the same time, the jaws of the trap are forced open against the action of springs 31 and 32. Tongue 5 of the latching device is then placed over the movable jaw of the trap and the transverse end strip of frame 18 (see Fig. 4), and is inserted beneath the catch 15. This raises the treadle 14 slightly and, at the same time, locks frame 18 to base 1 and holds the movable jaw open. It will be noted that in this position, the treadle lies beneath the net of the trap.

Assuming now that an animal steps upon the treadle, or disturbs it in any other manner, movement of the treadle releases tongue 5 from the latch. This releases both the movable jaw of the trap and also the entire assembly carried by frame 18. The jaws of the trap snap shut to completely envelop the animal and, at the same time, springs 20 and 21 move frame 18 to the position shown in Figs. 1 and 2, thereby bodily lifting the animal which is held in the trap in the position shown until its removal is desired.

It will be apparent that the device of my invention is simple in construction but, at the same time, performs its intended functions in a highly efficient and desirable manner. Due to its simplicity, it is easily adjusted and the parts thereof are not apt to be displaced or get out of order. The device is also relatively light in weight and may be transported from place to place very readily. While I have disclosed herein a specific embodiment of my invention, it will be apparent that various changes and modifications may be made. For example, the particular material out of which the various parts are made may be changed, if desired. Likewise, the manner in which the various parts are fastened together may be readily modified. It is, therefore, understood, that this disclosure is for the purpose of illustration only and is not a limitation upon the invention.

I claim:

1. In a device of the type described, a base, a frame pivotally mounted on said base, a trap carried by said frame, means for moving said frame relative to said base, and common means for holding said trap open and for rendering said first means inoperative until said device is sprung.

2. In a device of the type described, a base, a frame pivotally mounted on said base, a trap carried by said frame, spring means for moving said frame relative to said base, and common latch means for holding said trap open and for rendering said first means inoperative until said device is sprung.

3. In a device of the type described, a base, a trap pivotally carried on a pivot rod by said base, and means including the pivot rod for preventing said device from overturning during movement of said trap.

4. In a device of the type described, a base, a trap comprising a pair of relatively movable jaws and a net carried by said base, means on said base for latching said trap open, and means disposed beneath said net for releasing said latching means to spring said trap.

5. In a device of the type described, a base, a trap comprising a pair of relatively movable jaws and a net carried by said base, means on said base for latching said trap open, and a treadle disposed beneath said net for releasing said latching means to spring said trap.

WALTER A. GIBBS.